(12) United States Patent
Mock et al.

(10) Patent No.: US 6,749,212 B2
(45) Date of Patent: Jun. 15, 2004

(54) BICYCLE TRAILER HITCH OR ACCESSORY MOUNT

(75) Inventors: Aaron Christopher Mock, Lake Mills, WI (US); Jeffrey Small, Watertown, WI (US)

(73) Assignee: Trek Bicycle Corporation, Wateloo, WI (US)

( * ) Notice: Subject to any disclaimer, the term of this patent is extended or adjusted under 35 U.S.C. 154(b) by 0 days.

(21) Appl. No.: 10/265,928

(22) Filed: Oct. 7, 2002

(65) Prior Publication Data

US 2003/0155737 A1 Aug. 21, 2003

Related U.S. Application Data

(60) Provisional application No. 60/358,551, filed on Feb. 21, 2002.

(51) Int. Cl.[7] ............................................... B62K 27/00
(52) U.S. Cl. ...................................... 280/292; 280/204
(58) Field of Search ........................ 248/224.7, 220.21; 280/202, 204, 288.4, 292, 304.5

(56) References Cited

U.S. PATENT DOCUMENTS

| | | | | |
|---|---|---|---|---|
| 3,801,134 A | * | 4/1974 | Dees | 280/416.1 |
| 3,843,160 A | * | 10/1974 | Frushour et al. | 280/416.1 |
| 4,928,985 A | * | 5/1990 | Nowlin | 280/204 |
| 5,039,120 A | | 8/1991 | Stowe | |
| 5,076,600 A | * | 12/1991 | Fake | 280/204 |
| 5,215,037 A | * | 6/1993 | Allred | 119/771 |
| 5,240,266 A | * | 8/1993 | Kelley et al. | 280/204 |
| 5,318,318 A | | 6/1994 | Berner et al. | |
| 5,330,217 A | * | 7/1994 | McCarthy | 280/204 |
| 5,482,304 A | | 1/1996 | Smith | |
| 5,743,543 A | | 4/1998 | Chiu | |
| 5,785,335 A | | 7/1998 | George | |
| 5,975,549 A | | 11/1999 | Ockenden | |
| 6,155,582 A | | 12/2000 | Bourbeau | |
| 6,227,556 B1 | | 5/2001 | Ockenden | |
| 6,234,503 B1 | | 5/2001 | Ockenden | |
| 6,386,573 B1 | * | 5/2002 | Solomon | 280/504 |

FOREIGN PATENT DOCUMENTS

| | | | | |
|---|---|---|---|---|
| DE | 004227632 A1 | * | 2/1994 | B62B/3/00 |
| WO | PCT/US99/17453 | | 7/1999 | |

* cited by examiner

*Primary Examiner*—Avraham Lerner
(74) *Attorney, Agent, or Firm*—David C. Brezina; Barnes & Thornburg

(57) ABSTRACT

A bicycle trailer hitch or accessory mount uses a trailer tongue or accessory receiving flange on a body with a pin that is rotatably and removably carried in a integrally mounted bicycle frame socket, the body and socket each having a corresponding bearing surface.

5 Claims, 2 Drawing Sheets

BICYCLE TRAILER HITCH OR ACCESSORY MOUNT

CLAIM OF PRIORITY

This application claims priority based on our provisional application filed on Feb. 21, 2002 and having Serial No. 60/358,551 and entitled "Bicycle Trailer Hitch Mount"

BACKGROUND OF THE INVENTION

1. Field of the Invention

The invention is a bicycle trailer hitch or accessory mount formed and arranged with a receiving aperture integral with a bicycle frame seat stay array.

2. Description of Related Art

Bicycle trailer hitch mounts have been problematic since bicycle trailers appeared commercially several decades ago. New and different bicycle frame geometries have exacerbated difficulties in hitch mount arrangements.

Prior art arrangements have included three basic arrangements, all having slightly different disadvantages.

One alternative is to utilize a clamp loosely carried on a bicycle seat post, the seat post providing a cylindrical pin or post in a substantially vertical axis around which the trailer may rotate. This necessitated either removing a seat post, difficult on a road bike without a quick—quick release, or enabling the unclamping of the clamp mechanism, if it is desired to be removed. Alternatively, a horizontal pin could be disengaged from the trailer, but this has the disadvantage of leaving the clamp on the seat post.

Another alternative is to clamp a bracket of some kind directly to the bicycle frame. Brackets have been used for a variety of allied products, such as racks, child carrying seats, and could be adapted to trailer carrying. These frame mounted brackets have been mounted, for example, using clamps attached to seat stay. These seat stay mounts can be mounted in a high position or in a low position, the low position necessitating a long, bowed or curved trailer tongue to permit movement around a vertical axis to round curves in a road or trail without the trailer fouling the rear wheel.

Accessory mounts for lighter duty accessories follow many of the same principles described above, typically being bolted or clamped to the bicycle frame. Small accessories have also been bolted to brazed-on fittings comprising threaded apertures that receive bolts or machine screws, but these fastenings have typically been limited to small accessories such as water-bottle holders or racks.

Quick release seat post bag clips are shown in U.S. Pat. Nos. 5,496,089 and 5,593,126, but these embodiments were either formed integrally with a seat post or clamped to seat rails, not integral with the bicycle frame. These patents are incorporated by reference as if fully set forth herein.

All of the clamp-on or bolt-on arrangements share disadvantages of requiring additional fittings, having fasteners prone to vibration or loosening, and providing surplus weight. They also share the difficulty of rapid removal of the hitch arrangement.

SUMMARY OF THE INVENTION

The invention is a bicycle trailer hitch or accessory mount with a rotatable and removable pin fitted in a socket integral with the bicycle frame providing great strength with negligible additional weight, yet the hitch or accessory mount itself is readily removable, thereby enabling rapid disconnecting of the trailer and elimination of the added weight of the hitch or accessory mount when the bicycle is desired to be ridden without the trailer.

DESCRIPTION OF THE PREFERRED EMBODIMENT

Figure 1:
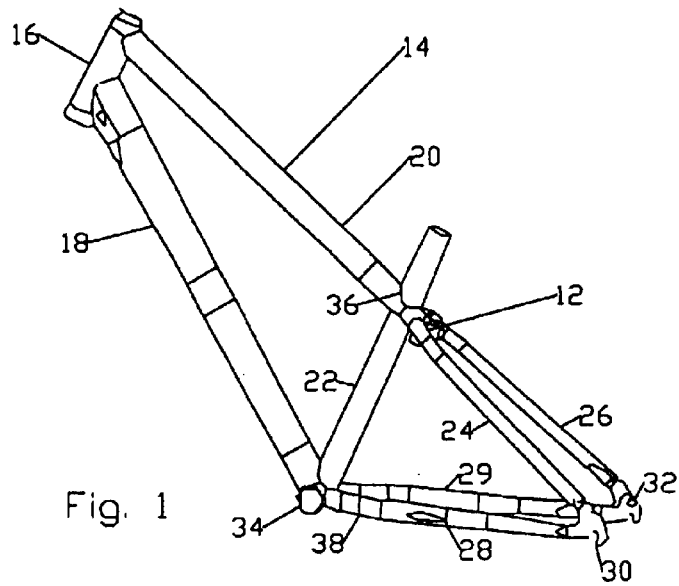
FIG. 1 is a perspective view of a bicycle frame with the trailer hitch or accessory mount in its removed position.
Figure 2:
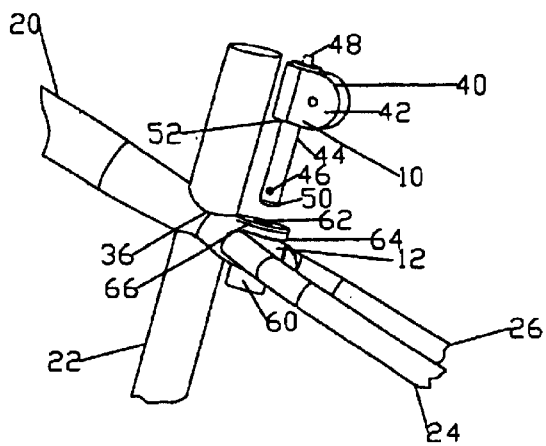
FIG. 2 is an enlarged perspective view of a bicycle frame with the trailer hitch or accessory mount in its removed position.
Figure 3:
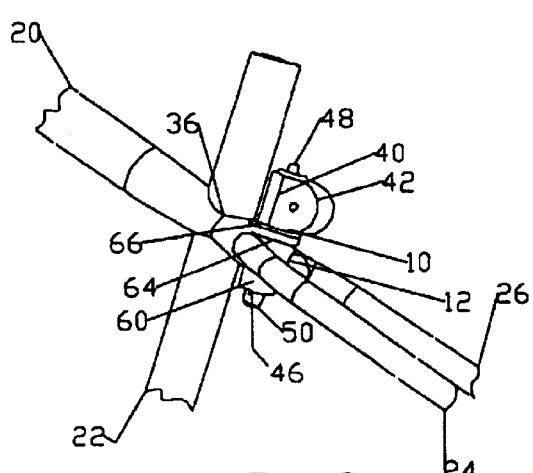
FIG. 3 is an enlarged perspective view of a bicycle frame with the trailer hitch or accessory mount in its operative position.
Figure 4:
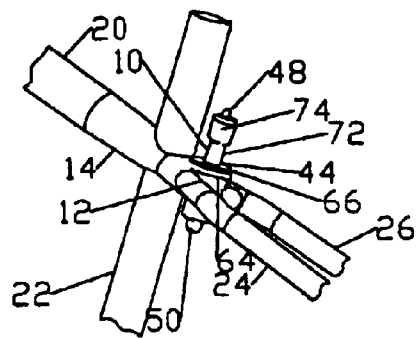
FIG. 4 is an enlarged perspective view of a bicycle frame with an accessory mount pin usable in the hitch or accessory mount or as a mount for other accessories.
Figure 5:
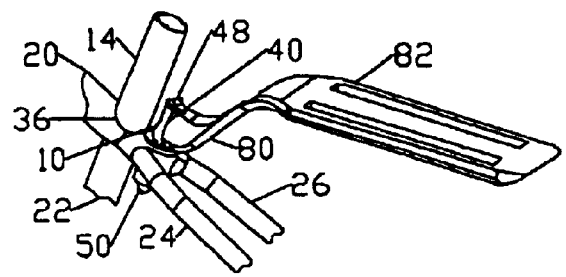
FIG. 5 is a perspective view of a portion of a bicycle frame with a mount for a bicycle rack.
Figure 6:
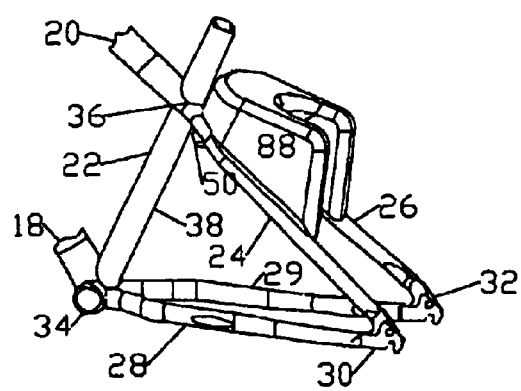
FIG. 6 is a perspective view of a portion of a bicycle frame with a mount for a bicycle container.
Figure 7:
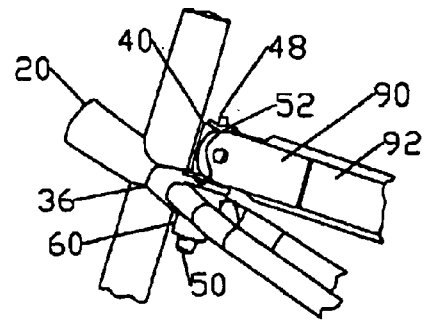
FIG. 7 is a perspective view of a portion of a bicycle frame with a trailer hitch tongue operatively connected to the mount.

A bicycle hitch or accessory mount 10 fits a socket or receptacle 12 integrally formed as part of a bicycle frame 14. In the preferred embodiment, frame 14 is a typical "diamond" frame having a head tube 16, main or down tube 18, top tube 20, and seat tube 22, forming the forward part of the frame, and the rear part in which the rear wheel (not shown) is rotatably carried is formed of left and right seat stays 24, 26, and left and right chainstays, the left chainstay 28 being shown, but the right chainstay being obscured in this drawing. The respective chainstays and seat stays intersect one another at rear dropouts 30, 32 which carry the axle for the wheel. The chainstays intersect the main tube 18 and seat tube 22 at bottom bracket 34. The seat stays 24, 26 intersect the seat tube at seat tube junction 36. Junction 36 may be formed in a number of different manners depending on the structural and use requirements of the frame 14. Thus, junction 36 may be a traditional seat lug to which tubes 20, 22, 24, and 26 are raised in the case of a steel frame, or adhesively bonded in the case of a composite frame, or a bonded aluminum frame. Similarly, junction 36 could be formed of welding metal tubes or integrally molded in a one-piece composite frame.

The intent of this invention is to have a permanently affixed receptacle 12 associated with frame 14, or the rear triangle 38. The rear triangle 38 is the customary term to refer to the rear wheel receiving assembly defined by the seat tube 22, seat stays 24, 26, and left chainstay 28 and the right chainstay 29.

Trailer hitch or accessory attachment member 10 is comprised of body 40 with a rearwardly depending flange 42 and a downwardly depending pin 44. Pin 44 preferably includes a ball detent 46 operated by a spring loaded push button 48, the mechanism being commonly used in sports equipment, such as sailboat, kayak, and backpacking equipment. The internal mechanism is expected to be known to a person of ordinary skill in the art.

Pin 44 preferably has a chamfered or rounded tip 50. At the bottom of body 40 is a bearing surface 52.

Receptacle 12 has a main tube 60 against which pin 44 bears when subject to the aforementioned acceleration and deceleration forces. Pin 44 is received in aperture 62 in tube 60. At the top of receptacle 12 is a reinforcing flange 64 upon which is a bearing 66. This is the preferred embodiment, the strength for resisting substantial deceleration loads such as while braking while directly borne by the contact of bearing surface 52 against bearing 66, is ultimately transmitted to flange 64, which has adequate strength and thickness to transmit those loads to frame 14 and/or rear triangle 38. Loads due to gravity and vertical bicycle movement components, such as imposed from riding over uneven terrain or road surfaces are also borne on these members.

Depending on the configuration of the bicycle, such as a rear suspension bicycle, it may or may not be more desirable to have the loads borne on the rear triangle 38 if it is relative to the front portion of the frame 14. However, under certain operating conditions, it will be superior to have the loads borne on frame 14 and have the suspension rear triangle 38 separately sprung, depending on the specific geometry of a rear suspension bicycle.

Further, bearing 66 and flange 64 might be advantageously combined in a single material, or bearing 66 omitted, depending on the material used in bearing surface 52.

In an alternative embodiment, detent 46 could be substituted by a simple transverse bore that receives a cotter pin or other spring loaded pin. However, the ball detent mechanism is preferred. Pin 44 has an axis along its length which is substantially vertical, but aligned parallel to the axis of seat tube 22. The axis is aligned so that most of the rearward tension and forward compression resulting from gravity, acceleration and deceleration forces or vertical components of loads imposed by bicycle movement or bouncing, are borne upon the pin 44 and aperture 62 and on bearing 52 contacting bearing surface 66, and does not provide significant loads against the detent 46.

In the preferred embodiment, receptacle 12 is mounted in close proximity to seat tube 22 at intersection 36, and in the space between seat stays 24, 26. An additional reinforcing structure 68 bridges the space between the ends of seat stays 24, 26.

Flange 42 in the preferred embodiment contains a transverse aperture 70, which can receive a trailer clevis 90 on a trailer tongue 92, a mode of attachment commonly used in bicycle trailers.

When viewing the pin 44 it can he seen that there is a shaft 72 and a head 74 When pin 44 is used in the various embodiments, shaft 72 fits in aperture 62 and head 74 receives, for example, the previously discussed body 40 for a hitch. Head 74 can also be adapted to receive other mounting hardware such as a bracket 80 for a rack 82, or fastener for a hard container 88 sometimes referred to colloquially as a glove box. Other bicycling accessories could be similarly adapted, such as bag holders of various configurations including those shown in U.S. Pat. Nos. 5,496,089 and 5,593,126, sharing a common assignee with the instant invention, water bottle holders, mudguards, pump holders, or the like. With many accessories, the complete, easy removal when not used or needed, permitted by the invention, is a significant advantage.

While in the preferred embodiment flange 42 simply comprises a solid high-strength light-weight material, in certain embodiments other structures, such as a stamped sheet metal structure actually forming two parallel flanges, could be suitable. In this embodiment, the sheet metal could, therefore, wrap around a solid pin carrying body.

Additionally, other trailer or accessory attachment structures could be used analogous to other trailer or accessory connection conventions, such as ball and socket, or hooks and eyes.

While the present invention has been disclosed and described with reference to certain embodiments thereof, it will be apparent, as noted above that variations and modifications may be made therein. It is also noted that the present invention is independent of the bicycle itself, and is not limited to particular bicycle frames or accessories. It is, thus, intended in the following claims to cover each variation and modification that falls within the true spirit and scope of the present invention.

We claim:

1. A bicycle trailer apparatus for a bicycle having a seat tube and seat stays comprising:

a bicycle having a permanently affixed receptacle;

said receptacle having a socket in a main tube;

said tube having an aperture adapted to receive a pin;

at the top of said socket is a reinforcing flange upon which is carried a bearing;

said receptacle is mounted in close proximity to the seat tube at the intersection of and the space between the seat stays;

an additional reinforcing structure bridges the space between the ends of the seat stays to provide reinforcement for the mounting of said receptacle to said frame;

a trailer hitch attachment member formed with a body;

said body having a rearwardly depending flange and a downwardly depending pin;

said pin has an end opposite said body;

said body having a bearing surface at its bottom;

said bearing contacting said bearing surface when said hitch attachment member is attached to said receptacle.

2. The trailer apparatus of claim 1 further comprising:

said pin has a ball detent operated by a spring loaded push button for releasing said detent against spring pressure.

3. The trailer apparatus of claim 1 further comprising:

said pin has a transverse bore proximate said end that is receivable of one of a cotter pin or a spring loaded pin.

4. A The trailer apparatus of claim 1 further comprising:

said pin is formed with a shaft and a head;

said shaft fits in the aperture and said head receives said body for a hitch.

5. The trailer apparatus of claim 1 further comprising:

said pin is formed with a shaft and a head;

said shaft fits in the aperture and said head is adapted to receive mounting hardware for at least one of:

a body for a hitch;

a bracket for a rack;

a fastener for a hard container;

a bicycle bag holder;

a water bottle holder;

a mudguards, or a pump holder.

\* \* \* \* \*